(12) United States Patent
Setoyama et al.

(10) Patent No.: US 6,188,684 B1
(45) Date of Patent: Feb. 13, 2001

(54) BIDIRECTIONAL COMMUNICATION SYSTEM

(75) Inventors: Toru Setoyama, Fujisawa; Takanori Miyamoto, Fuchu, both of (JP)

(73) Assignee: Hitachi, Ltd., Tokyo (JP)

( * ) Notice: Under 35 U.S.C. 154(b), the term of this patent shall be extended for 0 days.

(21) Appl. No.: 08/900,295

(22) Filed: Jul. 25, 1997

(30) Foreign Application Priority Data

Jul. 26, 1996 (JP) .................................................. 8-197445

(51) Int. Cl.⁷ ...................................................... H04J 3/12
(52) U.S. Cl. .......................................... 370/352; 370/522
(58) Field of Search .................................... 370/352, 401, 370/356, 252, 522; 379/88.17; 348/7, 9, 10, 12, 13

(56) References Cited

U.S. PATENT DOCUMENTS

| | | | |
|---|---|---|---|
| 4,225,884 | * | 9/1980 | Block et al. . |
| 4,518,989 | * | 5/1985 | Yabiki et al. . |
| 4,536,791 | * | 8/1985 | Campbell et al. . |
| 5,732,216 | * | 3/1998 | Logan et al. ............................. 348/7 |
| 5,929,850 | * | 7/1999 | Broadwin et al. ....................... 348/7 |

* cited by examiner

*Primary Examiner*—Huy D. Vu
(74) *Attorney, Agent, or Firm*—Antonelli, Terry, Stout & Kraus, LLP

(57) ABSTRACT

A bidirectional communication system in which dial-up connection for transmitting communication data may be disconnected when not used, and may be insured to be reconnected when needed. Also, the system includes an arrangement in which availability of connection with dial-up may be notified/determined in advance. The bidirectional communication system includes a first communication station and one or more second communication stations, the second communication stations receiving information delivery service from the first communication station, and the second communication stations performing data communication with the first communication station by means of dial-up link. The first communication station includes: an assignor assigning to the second communication station a protocol identifier of a network layer; a connector/disconnector for connecting/disconnecting the communication link according to respectively the presence and absence of communication data from the second communication station; and a storage holding the protocol identifier of the network layer assigned to the second communication station during the information delivery service from the second communication station.

25 Claims, 7 Drawing Sheets

BIDIRECTIONAL COMMUNICATION SYSTEM

BACKGROUND OF THE INVENTION

1. Field of the Invention

The present invention relates to a bidirectional communication system, more specifically, to a bidirectional communication system suitable for the use with a system in which a communication station is accessed by dial-up connection via analog telephone lines (PSTN: public switched telephone network) or integrated services digital network (ISDN), and exclusive (i.e., dedicated) lines for make use of services such as, for example, broadcasting and video on demand.

2. Description of Related Art

Recently, a new form of broadcasting services has become available by combining digital image compression techniques and a communication satellite communication (CS), as well as bidirectional communication.

The services include various kinds of multimedia services such as multi-channel broadcasting, video on demand, online-shopping, karaoke on demand, etc. The video on demand means a service providing a desired movie or a program at a specific time which a viewer desires, and in which the viewer has bi-directionality control in terms of video tape recorder (VTR) like control functions, e.g., pause, fast forward, and rewind. Karaoke on demand is similar to the video on demand, i.e., the delivery arrangement provides services of a karaoke program instead of movies and programs. These services are described in greater detail in Hiroshi Fujiwara, "Textbook Of Real MPEG", Multimedia Communication Workgroup Ed., ASCII Corp. (November 1995).

In furthering discussion, applicable digital image compression and communication satellite techniques will be described below, such techniques having been instrumental in having made available the above cited new form of services. More particularly, a typical image compression technique used in digital CS broadcasting is a MPEG-2 (Moving Picture Experts Group 2) technique. MPEG-2 was proposed as a standard in the ISO/IEC (International Standardization Organization/International Electrotechnical Commission), and such techniques makes possible image compression up to 4–9 Mbps with the image quality of current television broadcasting being held. Also, in standard digital CS broadcasting, a satellite transponder (transmitter responder) having bandwidth of 27 MHz is used for transmitting signals modified with Quadrature Phase Shift Keying (QPSK). By using QPSK modification, a signal of 54 Mbps may be transmittable, however, a substantial transmission rate per transponder may be approximately 27 Mbps except for redundancy codes added for error correction.

Thus, by using the above mentioned MPEG-2,3–6 programs may be transmitted per transponder to realize multi-channel broadcasting of several times, i.e., such transmission increase is advantageous as compared with the analog CS broadcasting in which only one program is transmitted per transponder. As a result thereof, the above cited new form of services may have been provided.

Most of these services are interactive services including bidirectional communication. Thus, not only are downstream links (a.k.a., down-links) from the communication station providing services to the viewers required, but also upstream links (a.k.a., up-links) from the viewers to the communication station are required. Currently, already existing analog phone lines (PSTN: public switched telephone networks), ISDN networks and exclusive lines work well for upstream links.

A background bidirectional communication system (suitable for background discussion with respect to the present invention) is comprised of a central communication station providing services, and remote viewers' terminals accepting services. More particularly, each viewer terminal is connected to the communication station via an upstream link such as an analog phone line, ISDN network or an exclusive line, and various broadcasting programs and multimedia services are received through a communication satellite link as a downstream link from the central communication station. Dial-up connection is usually used for connecting a viewer terminal to the communication station.

Returning now to discussion concerning providing/receiving broadcast/multimedia services, when making a dial-up connection from a viewer's terminal to a communication station through use of a phone line, at the time when the viewer's terminal dials the communication station through use of a phone line, the link is connected to a dial-up router of the communication station through the phone line network. Then, connection is made between the dial-up router and the viewer's terminal typically with a point-to-point protocol (PPP). PPP is a protocol for connecting between two points, e.g., a central communication station and a remote user terminal. For connecting with PPP, a data link layer of an open system interconnection (OSI) seven layered model is set for the remote communication station, thereafter the dial-up connected user is authenticated, and then the protocol for the network layer is set.

Dial-up connection is also frequently used for internet connecting, i.e., for connecting personal computer users (e.g., from home) to an internet provider, which, in general, is conducted via a PPP approach wherein a user initiates dial-up and log-on when the user wants to connect a personal computer to an Internet provider or Internet. More particularly, one typical example of the network layer protocol that the PPP sets at this time is an Internet Protocol (IP). The protocol of PPP for setting IP is Internet Protocol Control Protocol (IPCP). IPCP determines an IP addresses of both connected sides.

There are three methods for determining IP addresses as follows:

(1) assigning an IP address for each phone line number used for connection;

(2) assigning a fixed IP address for each partner at the other side of the connection, by identifying the connected partner at the stage of authentication; and (3) assigning dynamically one of unused IP addresses from a pool of IP addresses.

Method (2) is a static assignment, whereas method (3) is a dynamic assignment. Method (1) may be a static assignment when connecting by directly specifying the line number, while it may be a dynamic assignment if the call is automatically (i.e., randomly) assigned to a plurality of lines available when a main number is called.

If an IP address is decided, the user may receive various multimedia services by using an appropriate protocol for transport layer (such as a Transmission Control Protocol (TCP), and User Datagram Protocol (UDP)).

Other system architectures other than a communication satellite of use with the present invention is a cable television system using a Hybrid Fiber Coax (HFC) network in which a main backbone network is constructed with optical fibers, and a secondary distribution network for connection from the HFC network to homes are constructed with coaxial cables. In the HFC network, upstream and downstream (i.e., bidirectional) links are both able to be set therewithin. However, there are cases where sufficient bidirectional quality may not be achieved if the condition of the transmission installation is not suitable, or where upstream links are not available because of limited bandwidth capacity and the fact that bandwidth is reserved for the upstream links. Accordingly, an analog phone network, ISDN network, and exclusive lines are projected to be used as main upstream links in the present invention.

Detailed description of the dial-up connection as described above may be found in the article "PPP and Dial-up IP Connection", Shunji Ohno, UNIX Magazine, February 1995, pp. 33–34, ASCII Corp.; detailed description of PPP may be found in RFC (Request For Comment) 1661, "The Point-to-Point Protocol (PPP)", W. Simpson Ed., published by Internet Engineering Task Force (IETF), July 1994; the outline of PPP may be found in the foregoing "PPP and Dial-up IP Connection"; description of IP may be found in "Internet Protocol", J. Postel Ed., September 1981, published by IETF; and, detailed description of IPCP may be found in "The PPP Internet Protocol Control Protocol (IPCP)", G. McGregor, May 1992, published by IETF.

When viewing a movie using a video-on-demand service, after the viewer selects a program, typically only a few video operation control commands are used (e.g., End command). Accordingly, at most, only several commands are output at a beginning and end of a program and possibly at some intermediate time during the program. If a communication link is held for one or two hours during program viewing in order to send these few commands, link usage is inefficient. In the method of assigning IP addresses in the existing Personal Computer Communication Systems and the Internet, an approach is useable to disconnect a link in a case where there is no communication within a predetermined period of time, i.e., in order to avoid ineffective use (holding) of IP addresses and lines.

However, if an IP address is dynamically assigned and the link is disconnected, it may be possible that a different IP address will be assigned for each dial-up call by a user. Since application programs such as control programs for video on demand may execute, for example, the selection of the source of command and the program to be affected by a command in accordance with the IP address assigned to the terminal of the viewer, there are problems that if the IP address changes by reconnection, the service may not be controlled correctly thereafter.

In a case where IP addresses are statically assigned, after disconnecting and subsequently attempting a new dial-up connection at a later time, a connection may not be able to be made because all lines to the dial-up router are busy. Further, in case of dynamic assignment, there may be a temporary lack of IP addresses to be assigned. As the terminal cannot recognize a lack of available IP addresses before dial-up, there are problems that a telephone line charge must be paid for because no IP address is obtained even if the link is connected to the dial-up router, and a user becomes frustrated. More particularly, in case of both dynamic and static assignment, when any disorder happens at the communication station, if a viewer's terminal attempts a dial-up connection thereto without knowledge of a present status of the station, the link may obtain a useless connection to the station because even if connected there will be unsuccessful PPP negotiation. In this case, a telephone company line charge must be unneedlessly paid because the phone line is used.

SUMMARY OF THE INVENTION

The present invention has been made in view of overcoming the above mentioned problems, and its object is to provide a bidirectional communication system in which bandwidth is efficiently used as these can be a disconnecting of the dial-up connection during services, the service may be provided continuously even if the upstream link is disconnected/reconnected numerous times, and unnecessary telephone company line charges are avoided by avoiding reconnection during misopportune (i.e., problematic) times.

Another object of the present invention is to provide a bidirectional communication system in which unnecessary telephone company line charges may be saved by disconnecting the dial-up connection of upstream link during services if temporarily unused, and the reconnection is correctly made if required.

Still another object of the present invention is to provide a bidirectional communication system in which each remote viewer's terminal may know, before any upstream connection is attempted, that the services may not be accepted or provided even when connected, due to, for example, the lack of IP addresses or any other problem.

In order to solve the foregoing problems and achieve the foregoing objects, a first architecture in accordance with the bidirectional communication system of the present invention comprises a first communication station and one or more second stations, the second station receiving information broadcasting services from the first station through a communication link, as well as the second communication stations performing data communication with the first communication station by means of dial-up link, in which, the first communication station comprises: an assignor assigning to the second communication station a protocol identifier of network layer with reference to the OSI basic reference model; a connector/disconnector for connecting/disconnecting the communication link according to the presence and absence of communication data from the second communication station; and a storage holding the protocol identifier of the network layer assigned to the second communication station during the information delivery service from the second communication station.

A second architecture in accordance with the bidirectional communication system of the present invention comprises a first communication station and one or more second stations, the second station receiving information broadcasting services from the first station through a communication link, as well as performing data communication with the first communication station by means of dial-up link, in which the first communication station comprises: a connection controller transmitting control information to the second communication station for controlling the dial-up connection of the second communication station, and a transmitter transmitting the control information and connection link control signal to the dial-up connected second communication station.

Further, the second architecture of the bidirectional communication system is characterized in that, the first communication station which transmits control information comprises a problem detector detecting for occurrence of predetermined problems within the first communication station; and is further arranged such that the transmitter transmits the communication link control signal according to the contents of the problem detected by the problem detector.

Still further, the second architecture of the bidirectional communication system is characterized in that it comprises a plurality of communication links including the dial-up connection link for data communication from the second communication station to the first communication station, the second communication station comprising a connection controller for controlling line connection for: assigning a predetermined priority to the plurality of communication links; selecting a communication link with a highest present priority from communication links available among the plurality of communication links; and during data communication by means of that communication link, if another communication link with higher priority becomes available, switching connection from that communication link to the communication link with higher priority.

Still more specifically, the second architecture of the bidirectional communication system can be characterized in that, the first communication station comprises an assignor assigning a protocol identifier of a network layer, which identifier is specific to the second communication station; and the first communication station transmits to the second communication station a connection line control signal inhibiting use of the protocol identifier of the network layer already assigned to the second communication station, by using the transmitter for transmitting control information.

Still more specifically, the second architecture of the bidirectional communication system can be characterized in that the first communication station comprises a status monitor monitoring a status of use of the dial-up connection links, and if all of the dial-up connection links are in use, the first communication station transmits to the second communication station, a connection line control signal inhibiting calling to the dial-up connection links by using the transmitter for transmitting control information.

As a further arrangement, the second architecture of the bidirectional communication system is characterized in that the first communication station comprises a status monitor monitoring a status of the use of the dial-up connection links; and if all of the dial-up connection links are in use, the first communication station transmits to the second communication station a connection line control signal indicating that the dial-up connection cannot be made. Such transfer is by means of the transmitter for transmitting control information, and a purpose thereof is in order to notify the user of the second commaunication station that a dial-up connection cannot be made.

Further more specifically, a third architecture in accordance with the bidirectional communication system of the present invention is characterized in that, wireless broadcasting is used for the transmitter of control information.

Still further, a fourth architecture in accordance with the bidirectional communication system of the present invention is characterized in that hard-wired broadcasting is used for the transmitter for transmitting control information.

As still another arrangement, in the bidirectional communication system according to the second architecture, the transmission format of the connection line control signal uses a transport stream of MPEG-2 (Moving Picture Expert Group 2).

Further, in the bidirectional communication system according to either the first or the second architecture, a Point-to-Point Protocol (PPP) is used as a setting protocol for the data link layer of the OSI basic reference model for a dial-up link connection.

Further more specifically, in the bidirectional communication system according to either the first or the second architecture, an Internet Protocol (IP) is used for the protocol for the network layer of the OSI basic reference model and IP addresses are used for identifiers for the network layer.

Also, more specifically, in the bidirectional communication system according to either the third or the fourth architecture, the connection line control signal is transmitted by inserting the same between a vertical retrace period or a horizontal retrace period in a television signal.

More specifically, in the bidirectional communication system according to either the third or the fourth architecture, the connection line control signal is transmitted by multiplexing the same with an FM radio signal.

Still more specifically, in the bidirectional communication system according to either the third or the fourth architecture, the connection line control signal is transmitted by multiplexing the same with a PCM digital broadcasting signal.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only and is not to be taken by way of limitation, the spirit and scope of the present invention being limited only by the terms of the appended claims.

BRIEF DESCRIPTION OF THE DRAWING(S)

The following represents brief descriptions of the drawings, wherein.

DETAILED DESCRIPTION OF THE PREFERRED EMBODIMENTS OF THE INVENTION

Figure 1:
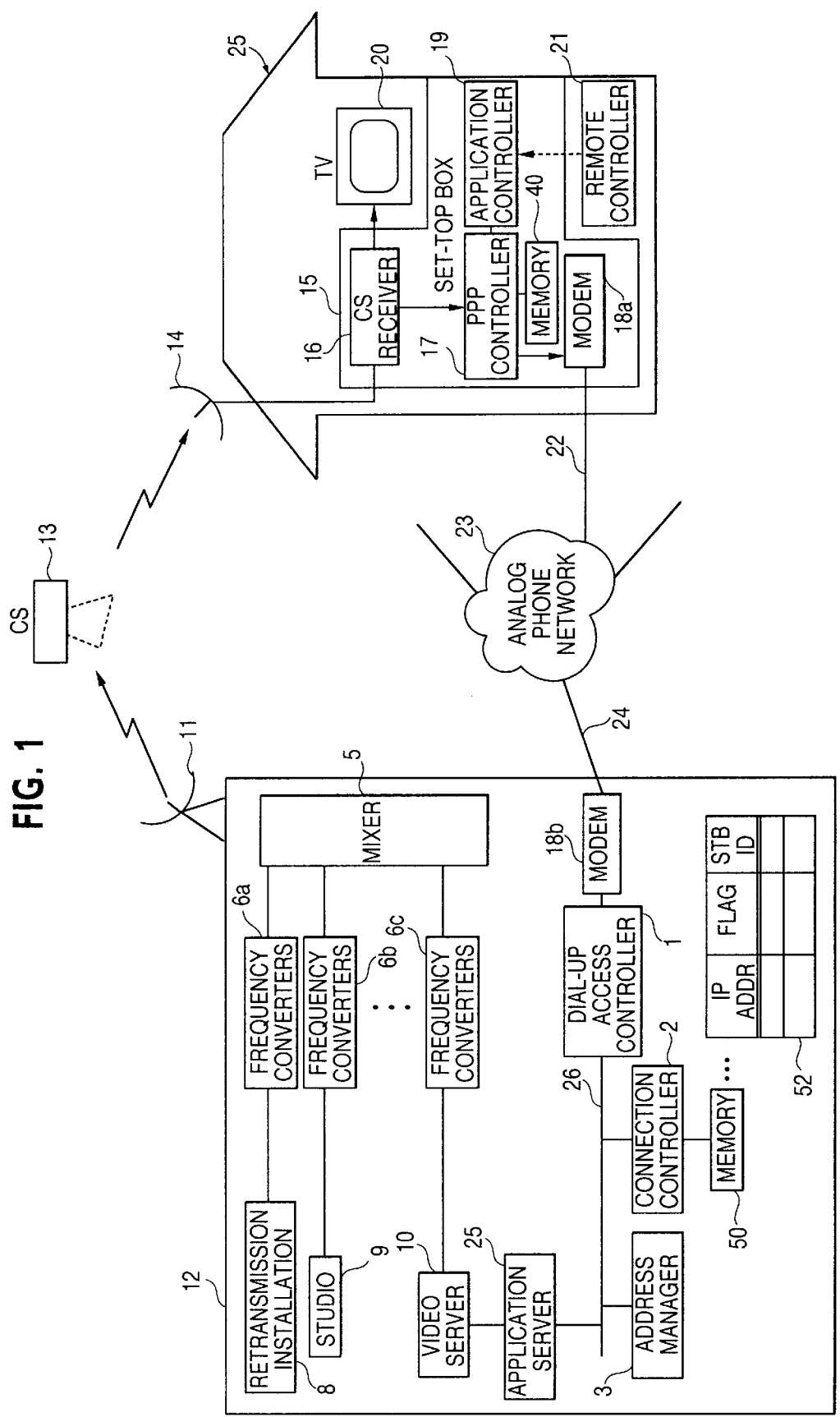
FIG. 1 illustrates a bidirectional communication system in accordance with the of the present invention.

Before beginning a detailed description of the subject invention, mention of the following is in order:

When appropriate, like reference numerals and characters are used to designate identical, corresponding or similar components in differing figure drawings.

Turning now to description of preferred embodiments in accordance with the present invention, reference is directed to FIGS. 1–7. More particularly, a first embodiment in accordance with the present invention will be now explained below in greater detail with reference to FIG. 1 and FIG. 5. In such first embodiment, a bidirectional communication system is described in which unnecessary telephone company line charges may be saved during the time requested services are provided, because of the fact that the upstream link is disconnectable when unused during delivery of services, and in which reconnection of the upstream link may be provided certainly.

Referring to FIG. 1, a bidirectional communication system of the first embodiment according to the present invention is illustrated. In this system, there are provided such bidirectional communication services as video on demand, online shopping, and karaoke on demand. There also can be provided other unidirectional communication services such as multi-channel broadcasting programs, special presentations (e.g., one time sports events) on demand, etc. Hereinbelow, several aspects/features/operations of such communication service embodiment will be described.

More particularly, with regard to unidirectional communication services, in a multi-channel broadcasting system, there may be considered to be two groups of programs. First are programs that an independent provider (i.e., independent of the broadcasting center 12) produces and provides to the broadcasting center 12 at the retransmission installation 8 solely for rebroadcasting. Second are pre-recorded or live programs (e.g., live programs, live sports events, etc.) transmitted from the studio 9. The broadcasting center 12 converts these programs into a signal in a band used for satellite communication through frequency converters 6a and 6b, then frequency multiplexes the same with mixer 5 to transmit from the transmission antenna 11 and then through the communication satellite 13 to be broadcast to user installations.

Turning next to bidirectional communication services, as shown in the FIG. 1 first embodiment of the present invention, the bidirectional communication system is composed of a broadcasting station 12 and a plurality of user installations, i.e., viewers' home 25, in which the down link from the broadcasting station 12 to each of respective homes 25 uses digital CS broadcast through a communication satellite 13, and the up-link from each of respective home 25 to the broadcasting station 12 uses analog telephone network 23 (PSTN: public switched telephone network). It may be conceivable that ISDN network or exclusive line may be used for the up-link rather than the analog telephone network.

Turning next to connection of the up-link, when a viewer desires to view a movie by making use of a video on demand service, the set-top-box (referred to as STB hereinafter) 15 in the viewer's home, in response, for example, to a viewer request via remote controller 21, attempts to connect an up-link to the broadcasting station. The STB is a device incorporating functions required for receiving services from the broadcasting station, which comprises a CS receiver 16 for receiving and processing signals from the satellite, an application controller 19 for processing commands from the remote-controller 21, a PPP controller 17 for controlling connection of the up-link, and a modem 18a. A television receiver 20 set in the home, for example, is connected to receiver signals from the set-top box 15 so as to display movies, other multi-media programs, text information, etc. The up-link is connected by dialing up between the STB 15 and a terminal (not shown) connected to a network 26 in the broadcasting station for communication.

In addition, the transmission standard of the network 26 in the broadcasting station 12 according to the present embodiment is assumed to be Ethernet (although other types of network connection arrangements may also be suitable). The typical network layer protocol used with the Ethernet is IP, in which the delivery of packets (delivery unit of data for IP protocol) is achieved by using as its identifier, IP addresses as has been mentioned earlier. In order for the STB 15 in a home to transfer IP packets to the terminal connected to the network 26 within a broadcasting station 12, the STB must know the IP address of the destination terminal (i.e., station terminal). Also, in order for the STB 15 to receive IP packets from the station terminal connected to the network 26 within a broadcasting station, the station terminal must specify the IP address of the STB 15 as a destination address.

The IP address are set as follows. More particularly, the STB 15 and the station terminal (connected to the network 26) are connected by means of phone call, and phone line cable 22, analog phone network 23 and exclusive line 24 and modems 18a, 18b. The PPP implemented in the PPP controller 17 of the STB 15 and in the dial-up access controller 1 in the broadcasting station 12 are used for the determination of the line quality for data link layer, the authentication of the connection with the STB 15, as well as the setting of IP as a network layer protocol. After verification that the STB 15 is a valid user (e.g., via password and/or serial number checking against a valid user table stored within a memory 50), the address manager 3 in the broadcasting station 12 determines an IP address for the STB 15. The IP address of the terminal connected to the network 26 with which the STB 15 communicates is, stored in a nonvolatile memory 40 in the STB 15. Or it may be possible to broadcast a specific address to each terminal by means of a down-link, or to transmit to each terminal by means of a specific transfer protocol on the dial-up connection link. As described above, there are at least three method available for assigning IP addresses, i.e.: (1) assigning an IP address for each phone line number used for connection; (2) assigning a fixed IP address for each partner at the other side of the connection, by identifying the connected partner at the stage of authentication; and, (3) assigning dynamically one of unused IP addresses from a pool of IP addresses. In the following example, it is assumed that method (3) is utilized, wherein IP addresses are dynamically assigned from a pool of IP addresses. However, as will become apparent shortly, IP addresses can be temporarily reserved with respect to a particular STB during the time of delivery of a particular information service, i.e., until delivery of a particular program is completed.

Turning next to procedure for the bidirectional communication services, transmission and reception of IP packets become available, as described above, after the IP address has been set. The procedure for the transmission and reception of IP packets will be now described. The packet output by the PPP controller 17 is modulated in the modem 18a to analog signals, then transferred through the phone line cable 22, analog phone network 23, and the exclusive line 24 to the modem 18b which demodulates the analog signals to digital signals, and provides the same to the dial-up access controller 1. Here the modem 18b is a so-called cluster modem which may receive a plurality of phone lines multiplexed on the exclusive line 24. The PPP and IPCP packets output from the dial-up access controller 1 are input to the PPP controller 17, passing through the path described above, but in the opposite direction. Once the network layer protocol has been established after the transmission and reception of such packets, the STB 15 and the terminal connected to the network 26 will send and receives IP packets between them. In this way, a viewer may send to the broadcasting station 12 such commands as program selection and VTR functions for obtaining services such as video on demand.

Now the communication procedure for receiving a video on demand service will be described. Initially the viewer uses the remote-controller 21 to send commands such as program selection or of a desired VTR function to the application controller 19 in the STB 15. Commands which may be processed by the application controller 19 will be processed therewithin. In contrast, other commands which may not be processed within the application controller 19 will be sent to the PPP controller 17 to be transmitted to application server 25 in the broadcasting station 12. The application controller 19, 25 is a server which stores programs for providing various services as described above. The PPP controller 17 specifies the IP address of the application server 25 as the destination address for IP packetizing the command, and then transmits it in the form of a PPP frame to the dial-up access controller 1 through the combination of the modem 18a, phone line cable 22, analog phone network 23, exclusive line 24 and the modem 18b.

At the broadcasting station, the dial-up access controller 1 decomposes the received PP)P frame to an IP packet and outputs the same to the network 26. The IP packet will be IP routed and delivered to the application server 25. The application server 25 decomposes the IP packet to retrieve the command that the viewer has sent from the remote-controller 21, and in response to such command, an appropriate control signal will be sent to the video server 10 in order to control the video server 10.

In the video server 10, video signals are stored in compressed form according to the MPEG-2 format. The MPEG-2 signal which is read out from the video server 10 is input to a frequency converter 6c. In addition, a signal prior to input to the frequency converter 6c may be further processed as to form an intermediate frequency signal. The frequency converter 6c converts the signal input thereto to a frequency band signal to be used for transmission between the transmitting antenna 11 and the communication satellite 13. The output signal from the frequency converter 6c is input into a mixer 5.

The mixer 5 also receives the different frequency band signals from the frequency converters 6a and 6b (i.e., corresponding to the TV signal sent from the retransmission installation 8 and the studio 9). The mixer 5 frequency multiplexes these signals into one output signal. The output signal from the mixer 5 is input to the transmission antenna 11 from which it is transmitted to the communication satellite 13. The communication satellite 13 receives, amplifies and retransmits the signal in a broadcast fashion. The signal sent from the communication satellite 13 is received by the receiving antenna 14 installed at each viewer's home 25. Or, although not shown, it can be received by a common receiving installation and then distributed (e.g., via cable) to each STB 15 installed in a home.

The input signal to the STB 15 will be subject to a predetermined CS receiving processing and MPEG-2 expansion processing for providing signals appropriate for the television receiver set 20. The viewer is then able to watch the program sent from the broadcasting station 12, and is able to cause a desired operation (corresponding to the initially command) to be effected onto the program in the television receiver set 20.

A discussion of disconnection and reestablishment of a phone line connection in a bidirectional communication service is described as follows. More particularly, to effect the procedure of a video on demand service as described above, a sequence of commands are used in the exemplary order of: program selection at the beginning of service, VTR commands during programs, and termination of service. In the above mentioned commands, the program selection and the termination are used only once per program. In contrast, the VTR function commands may be used during service at any time the viewer desires to do so. However, typically only a pause/unpause command is occasionally issued, and thus it may be considered that a number of times a typical viewer issues VTR commands during a program using the remote-controller 21 will be not so frequent. Thus, in the case of movies which are the core service of the video on demand, it may be concluded that an up-link for issuing commands may or may not be used at all during the period of time of one program of about two hours. In view of the above, in the bidirectional communication system in accordance with the present invention, an architecture has been conceived in which, the up-link will be disconnected during unnecessary period of times by performing the following processing steps, and it will be reconnected with the same IP address being allocated when a connect request occurs.

Figure 5:
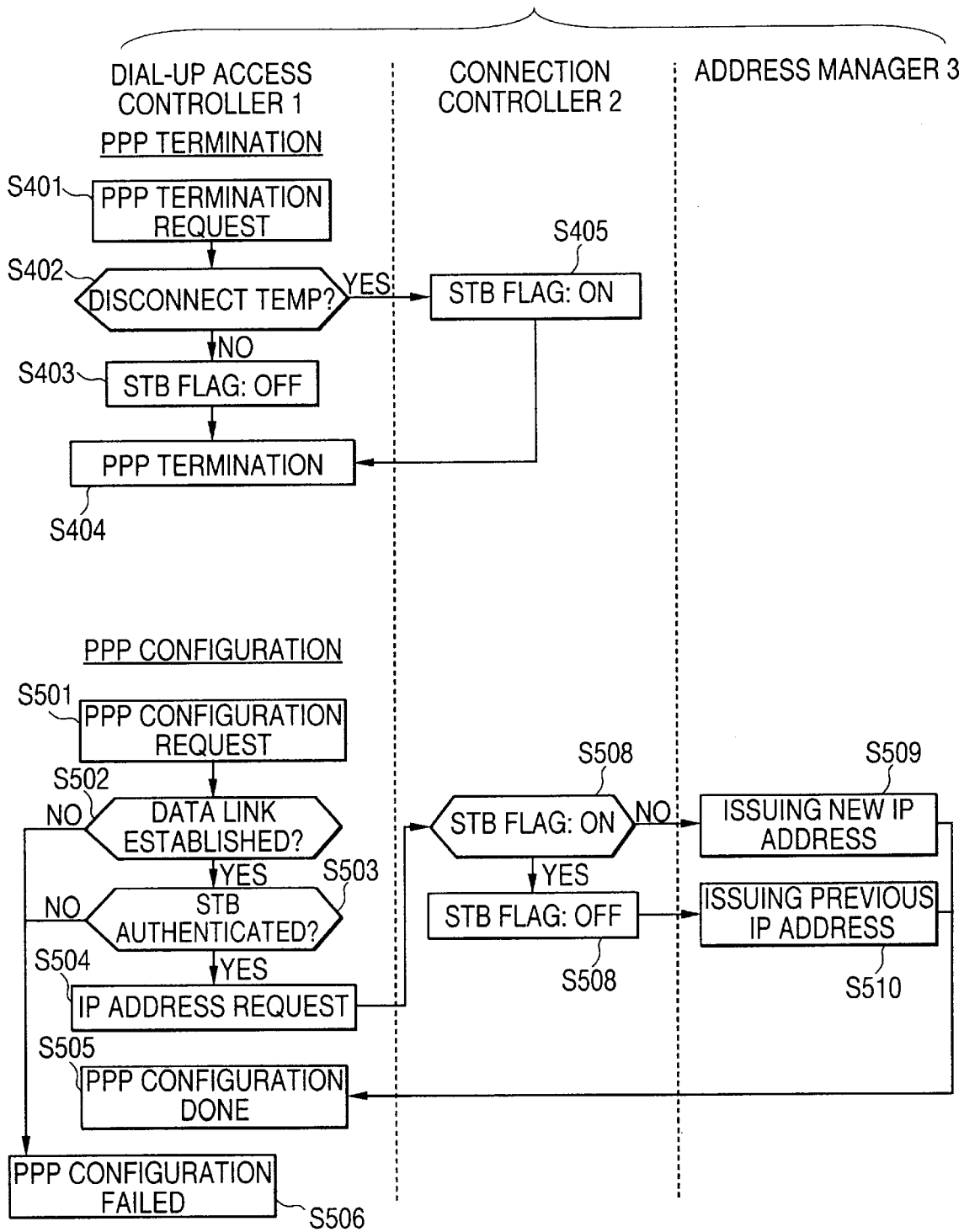
FIG. 5 illustrates a flowchart illustrating the PPP termination and PPP configuration in accordance with the first invention.

More particularly, processing steps for disconnecting and reconnecting the up-link will now be described in greater detail with reference to FIG. 5. More specifically, FIG. 5 illustrates a flowchart showing the PPP termination and the PPP configuration in accordance with the first embodiment of the present invention. In this embodiment, IP address management is performed through use of an STB flag and an appropriate table. More particularly, in FIG. 1 there is shown a memory 50 attached to the connection controller, such memory having an STB flag table 52 stored therein. The STB flag table contains entries which relate each IP address to an STB to which it is presently assigned (e.g., via suitable STB identification information such as password, STB serial number, calling telephone number, etc.), and further relate the IP address to a flag which indicates whether the IP address is presently reserved. Although, the memory 50 is shown attached to the connection controller 2, it can just as easily be provided attached (FIG. 2) to the network 26 as a common memory, or could instead be attached (not shown) to the address manager 3.

Continuing in discussion, although in the actual procedure of communication with PPP, a PPP configuration will occur first, PPP termination will be described first. Initially, a termination command is issued from the application controller 19 to the PPP controller 17 in the STB 15, for a PPP termination request to be sent to the dial-up access controller 1 in the broadcasting station 12 in a step (S401). If the termination indicates in a step (S402) a permanent end of a program (i.e., as opposed to a temporary stop during such services), the flags in the PPP controller 17 and the connection controller 2 are reset in a step (S403) since use of the same IP address is effected in a step will not be required in any following configuration (i.e., that particular program is over), and PPP termination is effected in a step (S404).

At the same time, if the controller in the STB 15 issues a PPP termination request even when the service is in progress because of the expiration of a predetermined time period, indicating an automated stop, STB flags in the PPP controller 17 and connection controller 2 will be set and a PPP termination process will be performed in a step (S404).

In a PPP configuration process (lower portion of FIG. 5), a command from the viewer is sent from the application controller 19 to the PPP controller 17 in the STB 15. As the connection is requested, the PPP controller 17 calls the dial-up access controller 1 in the broadcasting station 12, i.e., initiates an up-link in order to request PPP configuration in the step (S501). After the data up-link is established in step (S502), the dial-up access controller 1 authenticates the STB in step (S503). If either the establishment of data link or the authentication of STB fails, that PPP configuration will be unsuccessfully terminated as indicated by step (S506). If on the contrary, either the establishment of data link or the authentication of STB is successfully performed, the dial-up access controller 1 receives, in step (S504), the request from the STB 15 for an IP address. At this time, if a STB flag is already set for the STB 15 in the PPP controller 17 and the connection controller 2, i.e., indicating in step (S507) that a service is in progress, these flags are reset in step (S508), and the connection controller 2 controls the address manager 3 in step (S510) such that the same IP address as the preceding session is allocated or maintained. If in step (S507) the flags are not set indicating that service is not in progress, the address manager will issue a new IP address to the STB 15 in a step (S509). In this manner, the PPP controller 17 completes a PPP reconfiguration in a step (S505). After the PPP reconfiguration is established, the PPP controller proceeds to the step of transmitting commands from the application controller 19 in the STB 15 to the application server 25. It should be further noted at this time that each time the address manager issues or maintains an IP address for a particular STB 15, in addition to keeping track of such address allocation within the STB flag table 52, the allocated IP address is also informed to the STB 15 for storage within the STB memory 40. Accordingly, if the STB initiates reconnection, the IP address stored within the memory 40 can be used by the STB 15 in communications with the broadcasting station 12. Further, when the address manager 3 erases/invalidates an STB flag so as to unreserve an IP address (e.g., upon completion of delivery of an information service), the STB 15 can be likewise informed to erase/invalidate the IP address stored in the memory 40.

As described above, in this exemplary embodiment, the PPP controller 17 and the application server 25 may perform the allocation of the same IP address with respect to the STB of a service in progress without considering PPP reconfiguration, i.e., without issuing a new address. In addition, it is characterized in that no complicated arrangement of equipment is required for the disconnection and reconnection of phone line during service to be performed.

In the above description a case has been explained in which the IP address of the STB 15 is managed for each of bidirectional communication services. However, in addition to this case, it may be conceivable that a limited number of IP addresses are shared among STBs to minimize the number of IP addresses being managed by the address manager 3, in order to facilitate the address manager 3. In contrast, if a different IP address is allocated securely to each STB, the number of IP addresses being managed by the address manager 3 may be increased, while the PPP controller 17 and the connection controller 2 may be simplified.

A second embodiment in accordance with the present invention will now be described with reference to FIG. 2. In such second example, a case will be described in which an up-link calling from the STB 15 is controlled by instruction from the broadcasting station 12. More particularly, up-link solicitation and control by broadcasting station 12 has a use such as research for audience ratings of a broadcasting station, or for collecting receiving or viewing history recorded in the STB 15. In addition, by controlling the calling of STBs at the broadcasting station, the STBs may determine, before connecting respective viewer's terminal, whether a service may not be provided when a link is established due to the lack of IP addresses to be allocated or due to a problem.

Figure 8:
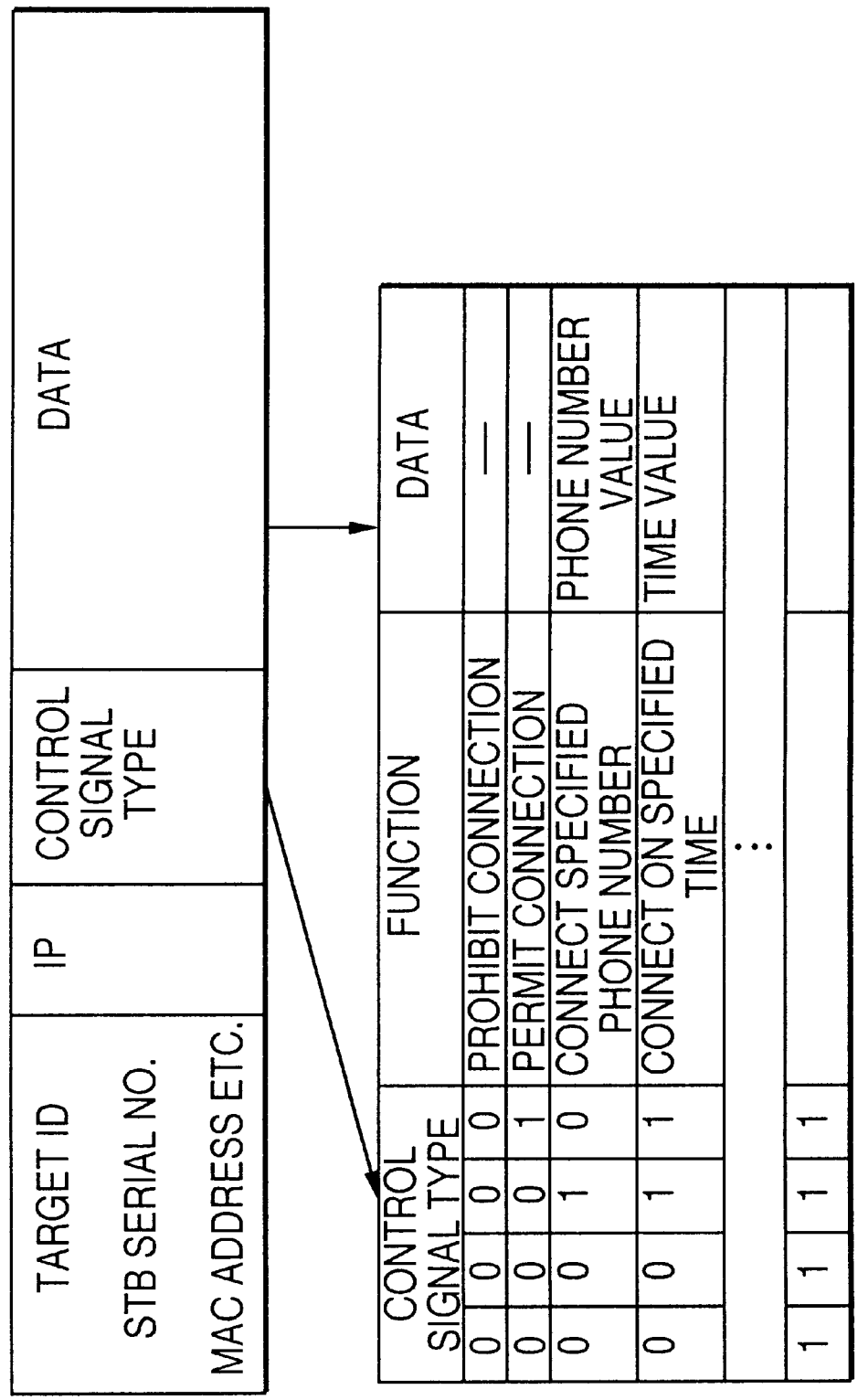
FIG. 8 illustrates an exemplary format of control information.

FIG. 8 illustrates an exemplary format of control information which can, for example, be transmitted in an MPEG2 transport stream, etc. Such formatted control information contains a plurality of fields including a Target ID, IP, Control Signal Type and Data. The Target ID field contains information such as an identification (ID) to which set-top box or boxes the control information pertains, e.g., the identification can be a serial number of the STB, MAC address, etc. The IP field contains information such as an Internet Protocol Address. The Control Signal Type field can contain, for example, four bits as indicated in the lower portion of FIG. 8, and can control various functions such as prohibit connection, permit connection, schedule connect to a specified telephone number, schedule connection at a specified time, etc. The Data field contain information, for example, which is complementary to the Control Signal Type field, such as indication of a specified telephone number for connection, a time of a scheduled connection, etc. Of course, the types and numbers of fields and the types of information contained within each field is not limited to the above example, but instead, a content of each control information format must be decided upon an installation-to-installation basis and/or a case-by-case basis.

Figure 2:
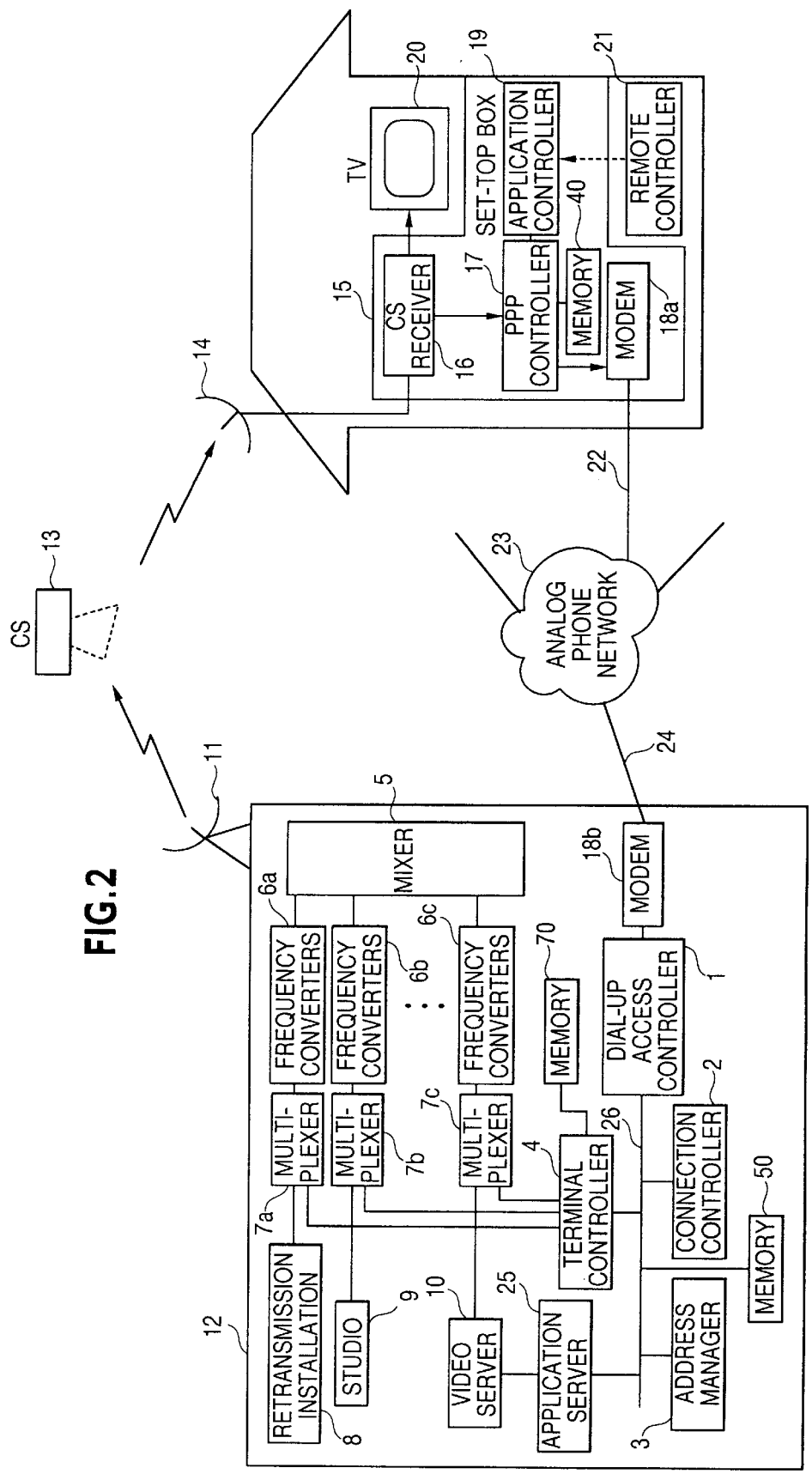
FIG. 2 illustrates a bidirectional communication system in accordance with the second embodiment of the present invention.

Referring to FIG. 2, illustrated is a bidirectional communication system in accordance with the second embodiment of the present invention. The system shown in FIG. 2 comprises: a terminal controller 4 added to the broadcasting station 12 of the system of FIG. 1; and multiplexers 7a, 7b, and 7c which multiplex a STB control signal sent from the terminal controller 4 with the signals from the retransmission installation 8, studio 9, and video server 10. The operation of the system shown in FIG. 2 will now be described below.

The terminal controller 4 of the broadcasting station 12 outputs a predetermined STB control signal for a particular STB 15 being instructed to perform the sequence of connection, i.e., the terminal controller 4 outputs such control signal along an output line for input to one input of the multiplexers 7a, 7b, 7c. Further, the terminal controller 4 also stores information about any instructed control which has been commanded, into a memory 70. Such stored information is used for at least two purposes. More particularly, first, any or all of the dial-up access controller 1, connection controller 2 and address manager 3 can gain access to such information so as to judge a present state of the system and/or to judge whether a particular STB 15 attempting connection is violating an instructed control. Second, the terminal controller may utilize such information later (e.g., when a problem has been obviated) to determine which STBs have previously been restricted and should now be unrestricted.

The MPEG-2 signals output respectively from the retransmission installation 8, studio 9, and video server 10 are input to the other multiplexers 7a, 7b, and 7c, respectively. The multiplexers 7a, 7b, and 7c are devices which perform multiplexing of any control signals and a plurality of transport streams of MPEG-2 into one single transport stream. In general, the transport stream of MPEG-2 output from the retransmission installation 8, studio 9, and video server 10 are controlled to be less than the capacity of signals that one transponder in a communication satellite 13 is capable to transfer. Because of this, such lower bit rate signals such as control signals are able to be further multiplexed, as described below. More particularly, the terminal controller 4 will look for a transport stream to which STB control signals may be multiplexed, and will send the STB control signals to the multiplexer 7a, 7b, 7c handling such transport stream. The output signals from the multiplexers are input to the frequency converters 6a, 6b, and 6c. The signals are then sent to the viewers as described with respect to the similar to the process shown in the first embodiment above.

At a viewer's site, the CS receiver 16 separates the STB control signals from the signals received from the communication satellite 13, and inputs the same to an input of the PPP controller 17. The PPP controller 17 decodes the STB control signals, and recognizes any dial-up connection execution command to perform a dial-up connection as described above in the first embodiment, such dial-up connection execution command being in order to establish a communication link between the STB 15 and the dial-up access controller 1, e.g., the command may specify a specific time, telephone number, information requested, etc. for connection. Being able to specify time, telephone number, information requested, etc., is important in that the broadcasting station can distribute (i.e., spread) commanded dial-ups over time and telephone resources so as to avoid dial-up traffic jams and users experiencing busy signals upon dial-up. Through this communication link, the broadcasting station 12 may perform any necessary tasks such as research for audience ratings and receiving/viewing history collection. In addition, once a link has been established, the STB control commands required for the tasks may be sent either through the down-link via the communication satellite or through the dial-up link via the network 26 to which the terminal controller 4 is connected.

Next, a case will be described in which the broadcasting station broadcasts to every STB to indicate that any service is not available due to some problems at the broadcasting station, i.e., by using the STB control signals transmitted from the terminal controller 4. As the terminal controller 4 in the broadcasting station 12 is connected to the network 26, it can be designed/programmed to detect any network problems or problems of other devices connected to the network 26 by installing an appropriate network management software such as Simple Network Management Protocol (SNMP). Then, in the bidirectional communication system in accordance with the present invention, when the SNMP detects a problem, the terminal controller 4 performs the steps for either inhibiting any dial-up connection or limiting the destination of calls with respect to every STB, as shown in FIG. 6 and 7.

Figure 6:
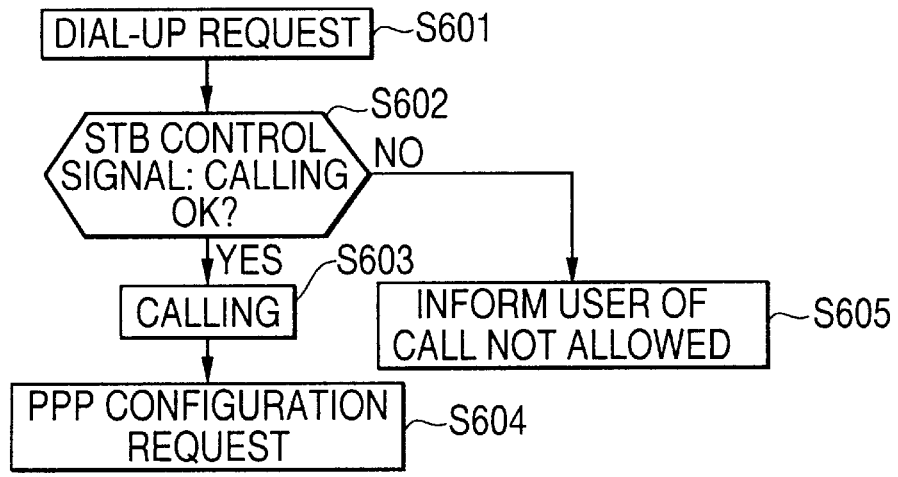
FIG. 6 illustrates a flowchart illustrating the inhibition or restriction of calls with respect to the PPP connecting devices.
Figure 7:
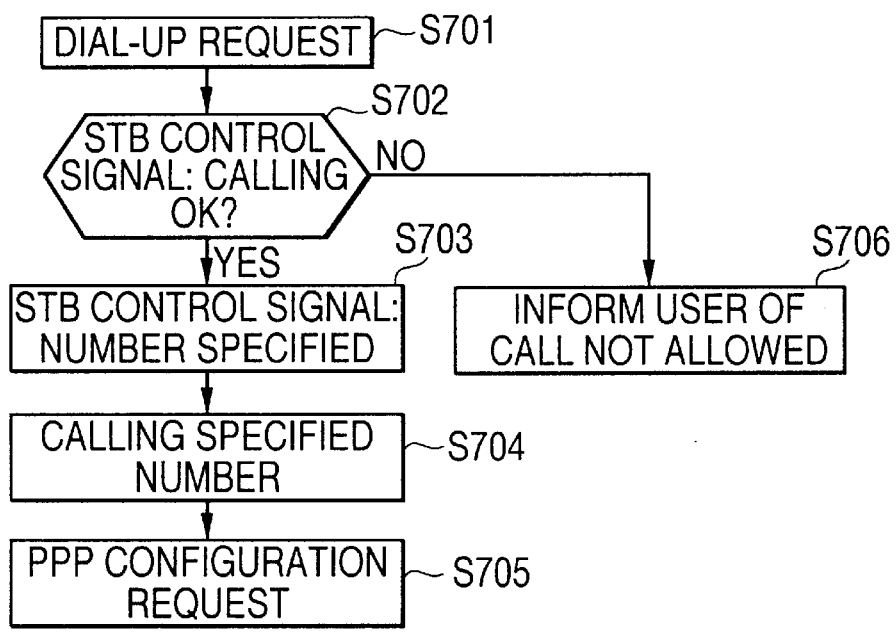
FIG. 7 illustrates a flowchart illustrating the calling to a phone number specified by the broadcasting station with respect to the PPP connecting devices.

More particularly, referring to FIG. 6, a flowchart is shown for inhibiting or limiting calls from and with respect to, the PPP connection devices. Referring to FIG. 7, a flowchart is shown for forcing the PPP connection devices to a phone number specified by the broadcasting station. A case will be now described in which calling itself is inhibited for the PPP connecting devices.

As shown in FIG. 6, a dial-up connection request is issued from the application controller 19 to the PPP controller 17 by means of operation of the remote-controller at the STB 15 in a step (S601). Then the PPP controller 17 will determine in a step (S602) whether or not calling is allowed from the STB control signals sent through the satellite, and if allowed, it starts calling in a step (S603) to request in a step (S604) a PPP configuration for the broadcasting station 12. If calling is inhibited, it informs the viewer in a step (S605) of the state that calling is not allowed.

Next, a case will be now described in which calling is limited to specific telephone members for PPP connection devices. As shown in FIG. 7, when a dial-up connection request is issued in step (S701) from the application controller 19 to the PPP controller 17 by means of operation of the remote-controller at the STB 15, The PPP controller 17 determines at a step (S702) whether calling is either inhibited or limited from the STB control signals sent through the satellite. If calling is formed in step (S703) to be limited to any specified phone number, then in step (S704) it calls the specified phone number and requests a PPP configuration from the broadcasting station 12 in a step (S705). If any calling is inhibited, then it informs the viewer, in a step (S706) that calling is not available.

The phone number specified in the STB control signals may indicate the main phone number or individual phone numbers of the broadcasting station, or may specify the phone number of callers authorized to call in. In accordance with this example, a toll-free number for phone calls may also be specified. In such a toll free case, a research for audience ratings may be performed while telephone costs thereof are charged to the broadcasting station.

Continuing discussion regarding control of the STBs by the broadcasting station 12, control of the STB 15 may be altered by changing the STB control signals according to a type and/or level of problems in the broadcasting station 12. For example, in a case in which no new IP address are available to be issued due to some (e.g. temporary) problems in the address manager 3, connection may be allowed only for any STB 15 which already has an IP address allocated at that moment, and dial-up may be inhibited for any other STBS requiring (i.e., not presently having) a new IP address allocation. In contrast, if a major problem is occurring in the broadcasting station, connection may be inhibited for all STBs 15.

When the calling is limited or inhibited as described above, an architecture (not shown) may be arranged within the CS receiver 16 which superimposes on the TV signals information which indicates that a dial-up connection is not available at the moment, e.g., via converted text string information displayed on the TV. Alternatively, the architecture may be incorporated between the CS receiver 16 and the television receiver set 20 to inform the viewer (e.g., via an LCD display) of the notice not to use bidirectional communication services.

In order to end dial-up restriction, the terminal controller 4 in the broadcasting station 12 may transmit further STB control signals to allow release of the inhibition or restriction of calling, and to restore the display when such text string information as described above is displayed.

In accordance with this embodiment, a call from the STB 15 may be controlled by instruction from the broadcasting station 12, and research for audience ratings or the collection of receiving/viewing history recorded in the STB 15 may be performed by control from the broadcasting station 12. In addition, by controlling at the broadcasting station the calling of STBs, the STBs may determine, before connecting respective viewer's terminal, whether a service may not be provided when a link is established due to the lack of IP addresses to be allocated or due to a problem.

Next, a third embodiment in accordance with the present invention will be described with reference to FIG. 3. More particularly, while the bidirectional communication system in the first and the second embodiments uses a communication satellite, the bidirectional communication system in the third embodiment is arranged to use a cable television (CATV) distribution system.

Figure 3:
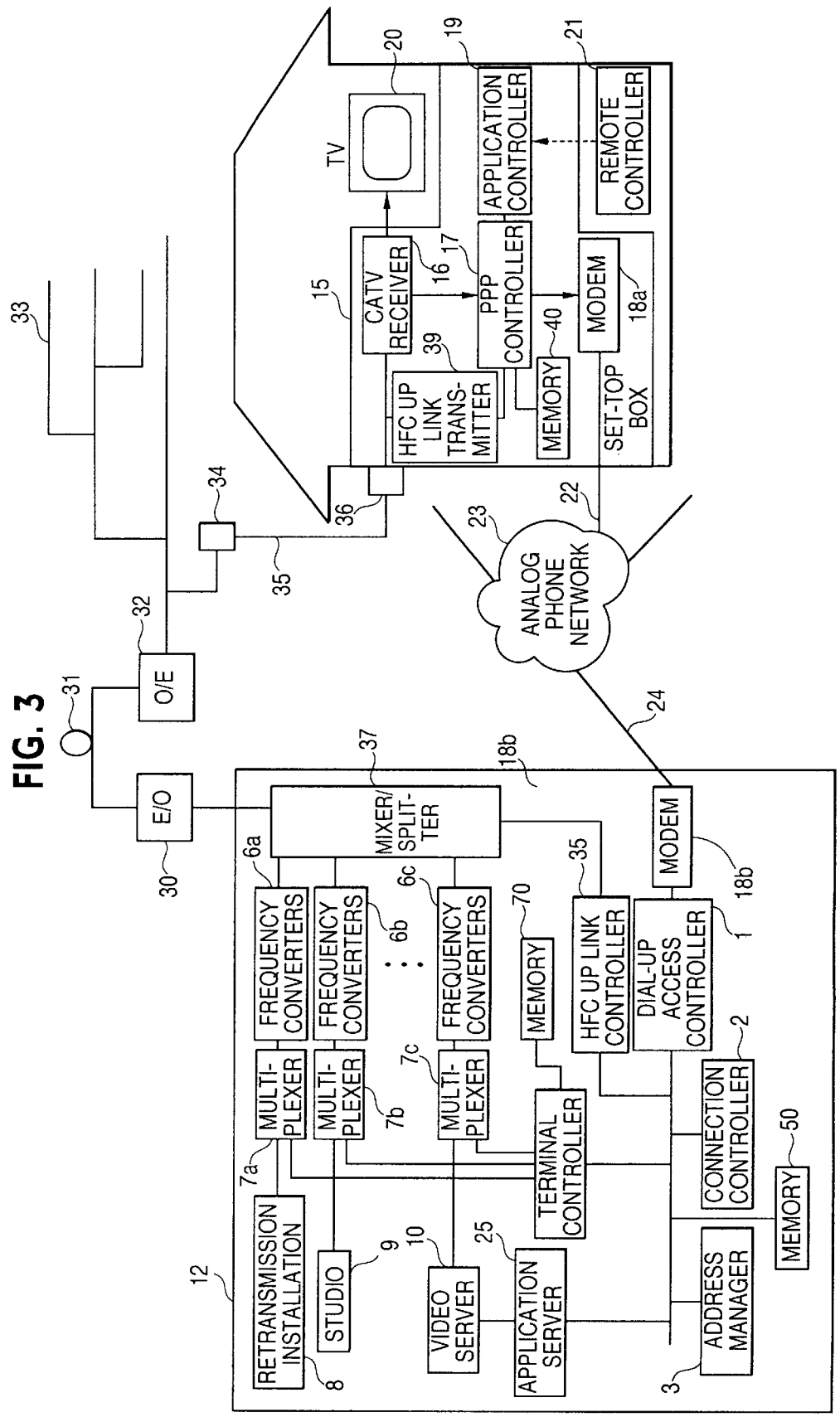
FIG. 3 illustrates a bidirectional communication system in accordance with the third embodiment of the present invention.

Referring to FIG. 3, the device receiving the signals output from the frequency converters 6a, 6b, and 6c of the broadcasting station 12 is a mixer/splitter 37, which also receives the signals of up-links. The output signals of the mixer/splitter 37 are input to an electro-optic transducer 30 for converting from electric signals to optical signals which are then transmitted through optical fibers 31 for a distance. Optical signals transmitted via the optical fibers 31 are input to an optic-electro transducer 32 for converting from optical signals to electric signals which are then transmitted to the viewer's site through a coaxial cable network 33. Although not shown in FIG. 3, there are a plurality of amplifiers (e.g., repeaters) within the coaxial cable network 33 for amplifying signals which may become attenuated during transmission. The signals transmitted through the coaxial cable network 33 passes through a tap-off 34, a dropline 35, a ground block 36, and then finally through customer premises cabling to be input to the STB 15.

In cable television systems, a bidirectional communication may be realized using the same transmission line by separating up-link frequency bands from down-link frequency bands, and the amplifiers in the coaxial cable network 33 are provided as bidirectional amplifiers. In general, a 10 MHz to 50 MHz band can be used for up-links, and a band of 70 MHz or more can be used for down-links. Therefore, the PPP controller 17 of the STB 15 may transmit the PPP configuration request to a HFC up-link transmitter 39, which converts signals suitable for the HFC physical layer, to transmit the signals through the HFC network to the mixer/splitter 37.

The mixer/splitter 37 receiving the PPP configuration request from the STB 15 through the HFC network, separates the 10 MHz to 50 MHz up-link bands, and then inputs these signals to the HFC up-link controller 38. The HFC up-link controller 38 converts signals at the level of a physical layer, and then transfers the signals into the network 26 in the broadcasting station 12. In this manner, a practical identical procedure to that realized by the analog phone network 23 in previously described embodiments of the invention may be realized by using the HFC up-link bands.

As described above, in the embodiment as shown in FIG. 3, two (2) kinds of up-links, i.e., the analog phone network 23 and the up-link bands of the HFC networks are available for use. Furthermore, in the bidirectional communication system using the digital CS broadcasting as shown in FIG. 2 as the second embodiment, a plurality of up-link routes may be prepared by using the ISDN network and the exclusive lines in addition to the analog phone network 23, so that in general a plurality of up-link routes may became available in a bidirectional communication system.

Discussion now turns to advantageous use of such plurality of up-link routes. More particularly, in the bidirectional communication system according to the present invention, a priority may be assigned to a desired routing in such a plurality of up-link routes. Priority may be decided according to objects such as, for example, the order of line quality, or the order of degree of connection charges associated with the lines (e.g., lowest cost connection line being assigned a highest priority).

In FIG. 3, in terms of cost to viewers, the HFC networks may be used free of charges or inexpensively because it is a proprietary installation of a cable television company, whereas the use of phone line networks is charged by telephone companies based on the distance to the destination and the time of connection. Therefore, an embodiment will be described below having a priority assigned, in the order of least connection charges, i.e., the HFC network having no connection charges associated therewith being assigned a highest priority, and a phone line network having expensive connection costs associated therewith being assigned a lower level priority.

When connecting from the PPP controller 17 of the STB 15 to the broadcasting station 12, the PPP controller 17 initially attempts to transmit signals to the HFC up-link transmitter 39, to connect by using the up-link bands of the HFC networks such HFC up-link having a higher rank in the priority. If connected successfully, communication is conducted via the HFC up-link. If not, dial-up is alternatively attempted via the modem 18a through the use of the analog phone network 23, such telephone up-link being lower in priority. If connected through telephone dial-up, communication is conducted even though the priority is lower.

While connected through telephone dial-up, the PPP controller 17 attempts continuously to transmit signals to the HFC up-link transmitter 39 to connect with the higher priority HFC network, i.e., to attempt any possible minimization of costs of the up-link connection. If subsequently connected to the HFC network, the PPP controller 17 holds the HFC connection while waiting until the application operating in the PPP controller 17 temporarily stops telephone line communication with the broadcasting station 12. If the PPP controller 17 detects a temporary absence of communication on the dial-up, it immediately disconnects the link on the telephone dial-up connection and switches over to the HFC up-link bands held for the communication with the broadcasting station 12. In this manner, the up-link may be switched without affecting the operation of applications, and to minimize costs. In the above embodiment, there is advantageously the effect that an up-link which is beneficial to the users are used for the first preference, in a bidirectional communication system having a plurality of up-link routes.

A fourth embodiment of the present invention will now be described below with reference to FIG. 4. In the first through third embodiments as have been described above, it has been considered that the telephone dial-up route between the analog phone network 23 and the broadcasting station 12 has one single main number, even when it comprises a plurality of phone lines. However, in the fourth embodiment, a case will be described in which the link is established via one of a plurality of phone lines therebetween having individual numbers for each of the lines.

Figure 4:
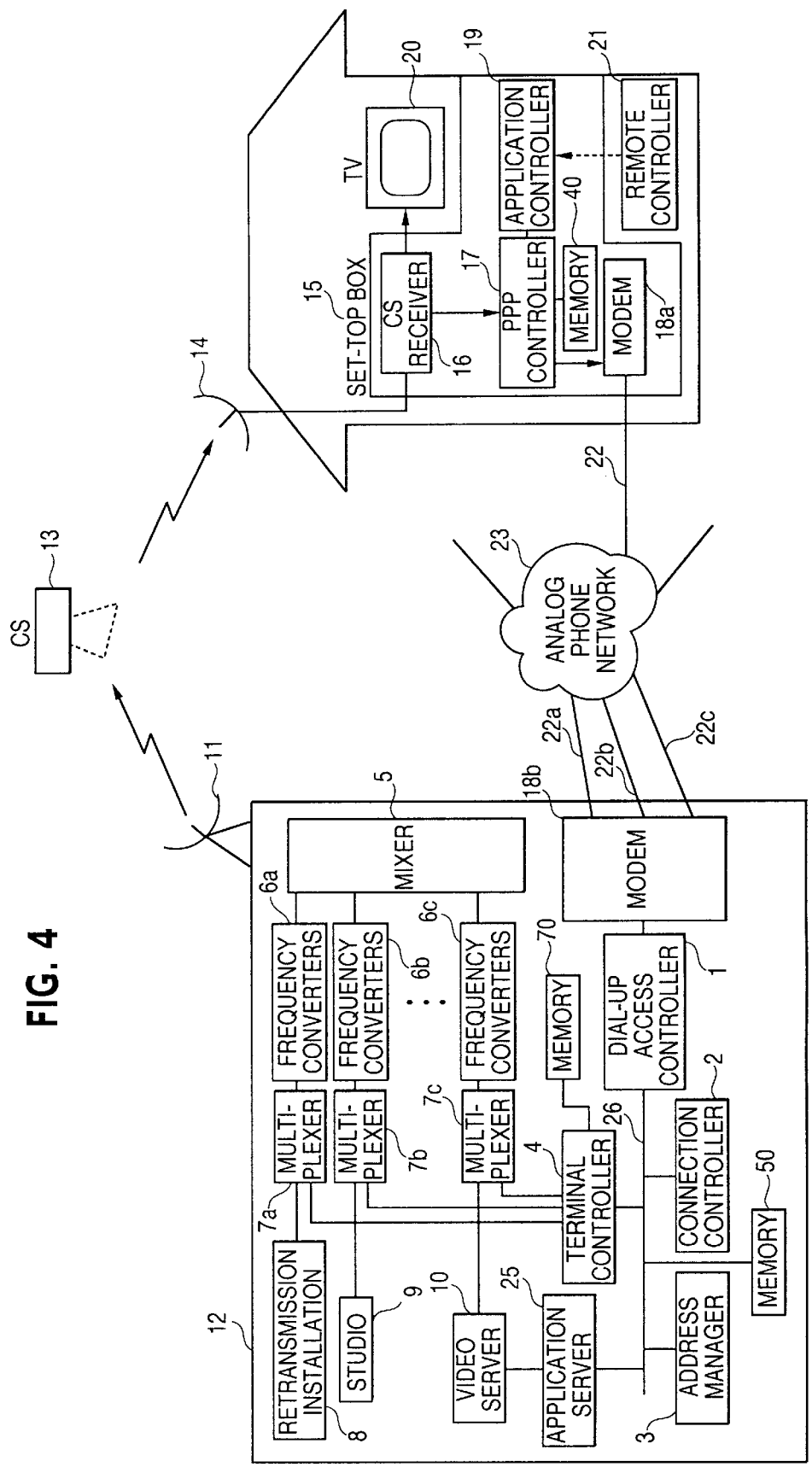
FIG. 4 illustrates a bidirectional communication system in accordance with the fourth embodiment of the present invention.

Referring to FIG. 4, a majority of such arrangement is identical to that of FIG. 2, except that a plurality of phone lines 22a, 22b, and 22c are connected between the analog phone network 23 and the modem 18b of the broadcasting station 12. Each of these phone lines 22a, 22b, and 22c is assigned to a different phone number, respectively. In addition, the address manager 3 allocates a different IP address to each of these phone lines 22a, 22b, and 22c. The terminal controller 4 in the broadcasting station 12 may detect the state of use of the phone lines 22a, 22b, and 22c through the dial-up access controller 1, by using the Simple Network Management Protocol for detecting problems as described above. Once the terminal controller 4 has detected the state of use of such phone lines, it informs the PPP controller 17 of the numbers of available lines using a down-link through the communication satellite, i.e., by multiplexing appropriate information with the transport streams of MPEG-2 into STB control signals.

When connecting by dial-up, the PPP controller 17 calls from the modem 18a by selecting one of available phone numbers transmitted in the STB control signals. In this system, each of phone lines 22a, 22b, and 22c is allocated to a different IP address, so that the PPP controller 17 of the STB 15 may obtain an IP address allocated to a line connected by the PPP configuration.

In the above embodiments, digital CS broadcasting and cable television are taken as example. However, the bidirectional communication system in accordance with the present invention may also be applied to any other cases with wired or wireless medium. Furthermore when applied to a medium for analog transmission, it may be possible to multiplex the STB control signals with the vertical/horizontal retrace periods of television signals rather than the MPEG-2 transport stream. In addition, when using FM radio broadcasting, a digital signal multiplexing scheme known as "viewing radio" may be applied to transmit the STB control signals. Also, a digital signal multiplexing scheme of the PCM audio broadcasting realized in the BS broadcasting may be applied.

The architecture as described in the first embodiment above in which the phone line is disconnected while there is no command to be sent, and the STB 15 and connection controller in the broadcasting station continue to hold an IP address until an application terminates, may be incorporated to any other embodiments as well. In this case the dial-up access controller 1 should indicate a line busy in the data of Simple Network Management Protocol. In this manner, it does not happen that no connection can be made if reconnection is attempted after the disconnection, and the services are insured to be provided.

The present invention has been made in view of providing the effect that it provides a bidirectional communication system in which bidirectional communication system the line charge may be saved by disconnecting the dial-up connection of upstream link during services if necessary, and the service may be provided continuously even if the link is once disconnected and again dial-up connected.

The present invention has also been made to provide the effect that it provides a bidirectional communication system in which bidirectional communication system the line charge may be saved by disconnecting the dial-up connection of upstream link during services if necessary, and the connection is correctly made if required.

The present invention has further been made to provide the effect that it provides a bidirectional communication system in which system each of viewer's terminal may know, before the connection of the link, that the services may not be provided even when connected, due to for example the lack of IP addresses or any problem.

This concludes the description of the preferred embodiments.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention.

What is claimed is:

1. A bi-directional communication system comprising:
   a first communication station and one or more second communication stations, the second communication stations receiving information delivery service from said first communication station through a first communication link, as well as performing data communication with said first communication station using a second communication link, in which
   said first communication station comprises:
   a station network;
   an assignor assigning to a second communication station which requests an information delivery service through said second communication link, a protocol identifier useable in said station network;
   a connector/disconnector for connecting and disconnecting the second communication link between the first and second communication stations; and
   a storage for holding, after an information delivery service has been requested and the second communication link has been disconnected, said protocol identifier assigned to the second communication station until a delivery of said information delivery service from the first communication station to said second communication station has been completed.

2. A system as claimed in claim 1,
   wherein said first communication link is more specifically a broadcast link, and said second communication link is more specifically a direct communication link.

3. A system as claimed in claim 1,
   wherein said first communication link is more specifically a satellite communication link, and said second communication link is more specifically a telephone line communication link.

4. A system as claimed in claim 1,
   wherein said first and second communication links are each more specifically one of: a satellite communication link, a telephone line communication link, a hard-wired communication link, a cable television (CATV) communication link, a broadcast television communication link, a broadcast radio communication link, an internet communication link.

5. A system as claimed in claim 1,
   wherein said first communication link is more specifically a cable television (CATV) communication link, and said second communication link is more specifically a telephone line communication link.

6. A system as claimed in claim 1, wherein said second communication link is established by using point-to-point protocol as protocol of the data-link layer in the Open System Interconnection basic reference model.

7. A system as claimed in claim 1, wherein on said second communication link, Internet Protocol is used as protocol of the network layer in the OSI basic reference model.

8. A system as claimed in claim 1,
   wherein said second communication link is more specifically a plurality of communication links for data communication from said second communication station to said first communication station, and in which said second communication station comprises:
   a prioritizer assigning a predetermined priority to each communication link of said plurality of communication links;
   a selector selecting a communication link having a highest priority from communication links presently available among said plurality of communication links; and
   a connector which performs data communication using the selected communication link, and which, if another communication link with higher priority becomes available during data communication, switching connection from the selected communication link to the communication link with higher priority.

9. A system as claimed in claim 8, wherein said plurality of communication links is more specifically a CATV connection link and a telephone line connection link, and said prioritizer assigns a higher priority to the CATV communication link than the telephone line communication link.

10. A system as claimed in claim 8, wherein said prioritizer assigning a predetermined priority to each communication link of said plurality of communication links, and said second communication station comprises a priority controller for controlling line connection according to said predetermined priority to said plurality of communication links.

11. A system as claimed in claim 1, wherein said connector/disconnector more specifically performs connecting and disconnecting of the second communication link in response to respectively the presence and absence of communication data from the second communication station.

12. A system as claimed in claim 1, wherein:
    said first communication station comprises a control transmitter transmitting through at least one of said first and second communication links, at least one of connection and disconnection control information to the second communication stations, for controlling a connection/disconnection of the second communication station to the first communication station; and
    said second communication station comprises a connector/disconnector which uses said control information to control connection/disconnection of said second communication station to said first communication station through said second communication link.

13. A system as claimed in claim 12, wherein said control information more specifically contains at least one of: information designating at least one said second communication station to which the control information pertains; information for at least temporarily prohibiting connection; a scheduled time for connection; a scheduled time for disconnection; designation of a second communication link to be used for connection; information requested to be provided from said second communication station to said first communication station during connection; display information for providing a display of guidance information pertaining to said control information.

14. A system as claimed in claim 12, wherein:
    said first communication station which has said control transmitter comprises a problem detector detecting for occurrence of predetermined problems within the first communication station; and
    said control transmitter transmits said control information according to content/nature of a problem detected by said problem detector.

15. A system as claimed in claim 12, wherein:
    said first communication station comprises a monitoring arrangement monitoring at least one of: a present capacity/availability to receive said data communication from said second communication link, and a present capacity/availability to provide a specific said information delivery service; and
    if the capacity/availability is presently unavailable, said first communication station transmits to the second communication station the control information at least temporarily inhibiting connection via said second communication link.

16. A system as claimed in claim 12, wherein said control information is transmitted in at least one of: a transport stream according to MPEG-2 (Moving Picture Expert Group 2) system used as a transmission format; vertical retrace interval of a television signal; a horizontal retrace interval of a television signal; an FM radio signal; and, a PCM digital broadcasting signal.

17. A system as claimed in claim 1, wherein said information delivery service is more specifically at least one of: multi-channel broadcasting; video on demand; kareoke on demand; on-line shopping; and, special presentations on demand.

18. A bi-directional communication system comprising:
    a first communication station and at least one second communication station, the second communication station receiving information delivery service from said first communication station through a first communication link, as well as performing data communication with said first communication station using a second communication link, in which
    said first communication station comprises a control transmitter transmitting through at least one of said first and second communication links, at least one of connection and disconnection control information to the second communication station, for controlling a connection/disconnection of the second communication station to the first communication station; and
    said second communication station comprises a connector/disconnector which uses said control information to control connection/disconnection of said second communication station to said first communication station through said second communication link, to control transmitting of a program of said information delivery service in real time, wherein:
    said first communication station which has said control transmitter comprises a problem detector detecting for occurrence of predetermined problems within the first communication station; and
    said control transmitter transmits said control information to said at least one second communication station according to content/nature of a problem detected by said problem detector.

19. A bi-directional communication system comprising:
    a first communication station and at least one second communication station, the second communication station receiving information delivery service from said first communication station through a first communication link, as well as performing data communication with said first communication station usiny a second communication link, in which
    said first communication station comprises a control transmitter transmitting throunh at least one of said first and second communication links, at least one of connection and disconnection control information to the second communication station, for controlling a connection/disconnection of the second communication station to the first communication station; and
    said second communication station comprises a connector/disconnector which uses said control information to control connection/disconnection of said second communication station to said first communication station through said second communication link, to control transmitting of a program of said information delivery service in real time, further comprising:
    an assignor assigning to a second communication station which requests an information delivery service through said second communication link, a protocol identifier useable in a station network;
    a storage for holding, after an information delivery service has been requested and the second communication link has been disconnected, said protocol identifier assigned to the second communication station until a delivery of said information delivery service from the first communication station to said second communication station has been completed.

20. A bi-directional communication system comprising:

a first communication station and at least one second communication station, the second communication station receiving information delivery service from said first communication station through a first communication link, as well as performing data commulication with said first communication station using a second communication link, in which said first communication station comprises a control transmitter transmitting through at least one of said first and second communication links, at least one of connection and disconnection control information to the second communication station, for controlling a connection/disconnection of the second communication station to the first communication station; and said second communication station comprises a connector/disconnector which uses said control information to control connection/disconnection of said second communication station to said first communication station through said second communication link, to control transmitting of a program of said information delivery service in real time, wherein said second communication link is established by using point-to-point protocol as protocol of the data-link layer in the Open System Interconnection basic reference model.

21. A bi-directional communication system comprising:

a first communication station and at least one second communication station, the second communication station receiving information delivery service from said first communication station through a first communication link, as well as performing data communication with said first communication station using a second communication link, in which said first communication station comprises a control transmitter transmitting through at least one of said first and second communication links, at least one of connection and disconnection control information to the second communication station, for controlling a connection/disconnection of the second communication station to the first communication station; and said second communication station comprises a connector/disconnector which uses said control information to control connection/disconnection of said second communication station to said first communication station through said second communication link, to control transmitting of a program of said information delivery service in real time, wherein on said second communication link, Internet Protocol is used as protocol of the network layer in the OSI basic reference model.

22. A bi-directional communication system comprising:

a first communication station and at least one second communication station, the second communication station receiving information delivery service from said first communication station through a first communication link, as well as performing data communication with said first communication station using a second communication link, in which said first communication station comprises a control transmitter transmitting through at least one of said first and second communication links, at least one of connection and disconnection control information to the second communication station, for controlling a connection/disconnection of the second communication station to the first communication station; and said second communication station comprises a connector/disconnector which uses said control information to control connection/disconnection of said second communication station to said first communication station through said second communication link, to control transmitting of a program of said information delivery service in real time, wherein said second communication link is more specifically a plurality of communication links for data communication from said second communication station to said first communication station, and in which said second communication station comprises:

a prioritizer assigning a predetermined priority to each communication link of said plurality of communication links;

a selector selecting a communication link having a highest priority from communication links presently available among said plurality of communication links; and a connector which performs data communication using the selected communication link, and which, if another communication link with higher priority becomes available during data communication, switching connection from the selected communication link to the communication link with higher priority.

23. A system as claimed in claim 22, wherein said plurality of communication links is more specifically a CATV connection link and a telephone line connection link, and said prioritzer assigns a higher priority to the CATV communication link than the telephone line communication link.

24. A system as claimed in claim 22, wherein said prioritizer assigning a predetermined priority to each communication link of said plurality of communication links, and said second communication station comprises a priority controller for controlling line connection according to said predetermined priority to said plurality of communication links.

25. A bi-directional communication system comprising:

a first communication station and at least one second communication station, the second communication station receiving information delivery service from said first communication station through a first communication link, as well as performing data communication with said first communication station using a second communication link, in which said first communication station comprises a control transmitter transmitting through at least one of said first and second communication links, at least one of connection and disconnection control information to the second communication station, for controlling a connection/disconnection of the second communication station to the first communication station; and said second communication station comprises a connector/disconnector which uses said control information to control connection/disconnection of said second communication station to said first communication station through said second communication link, to control transmitting of a program of said information delivery service in real time, wherein said connector/disconnector more specifically performs connecting and disconnecting of the second communication link in response to respectively the presence and absence of communication data from the second communication station.

* * * * *